Feb. 11, 1947.  S. J. STANTON  2,415,447
DENTAL CARE OUTFIT
Filed Nov. 18, 1944  5 Sheets-Sheet 1
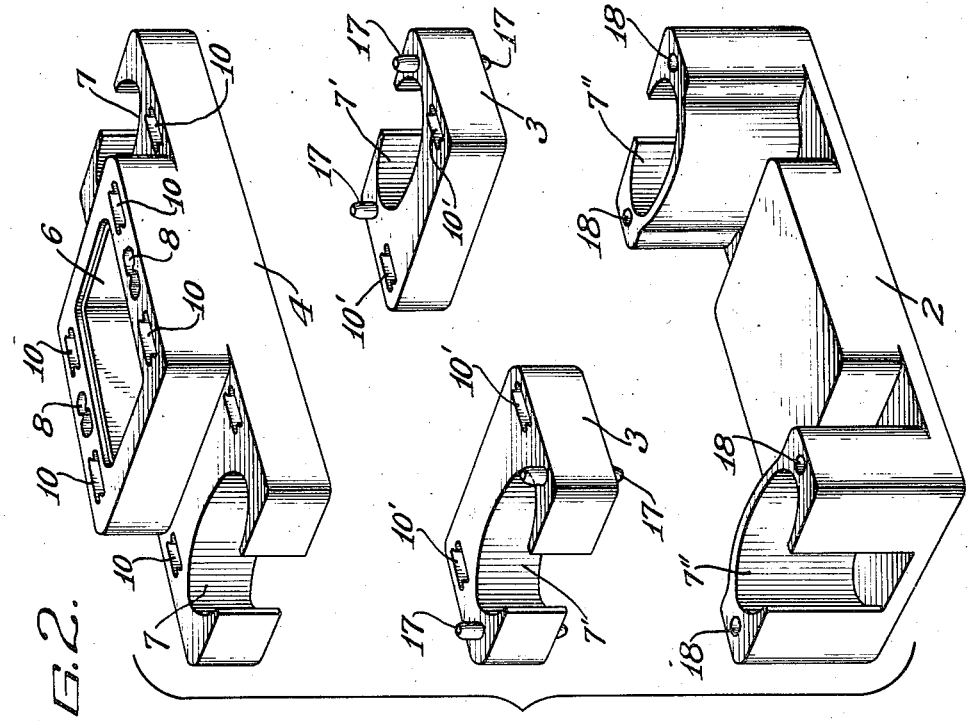
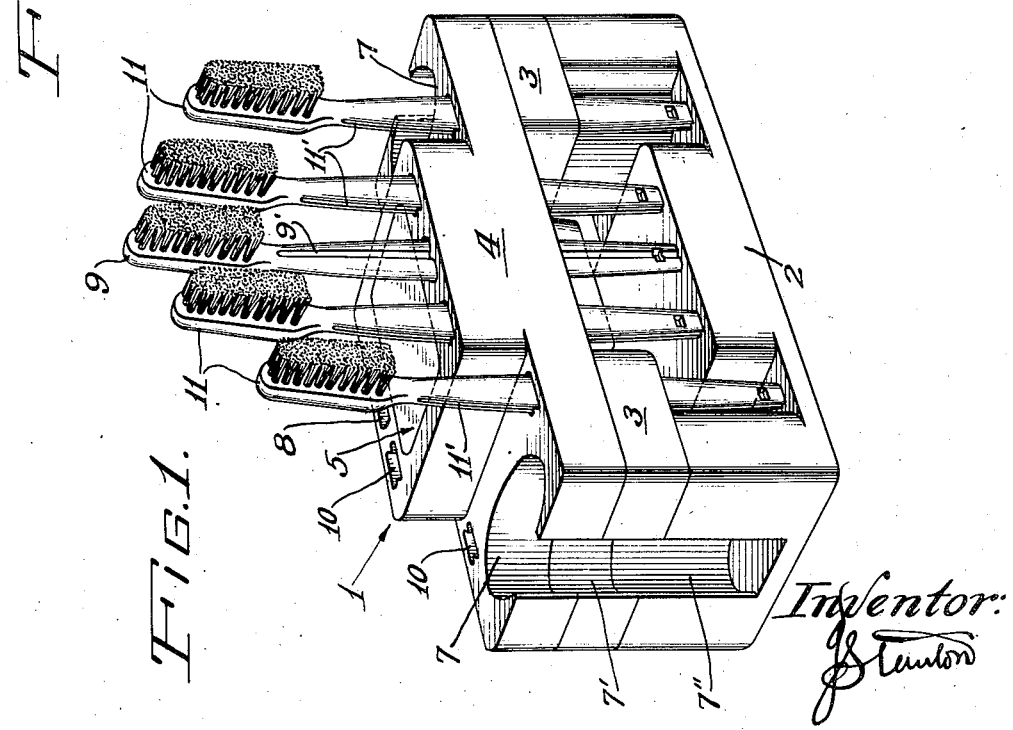

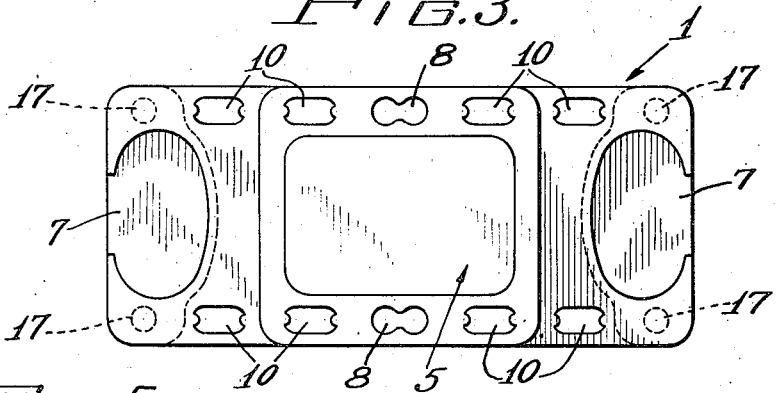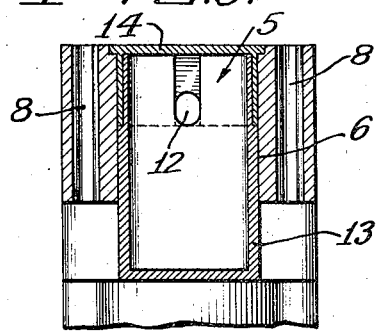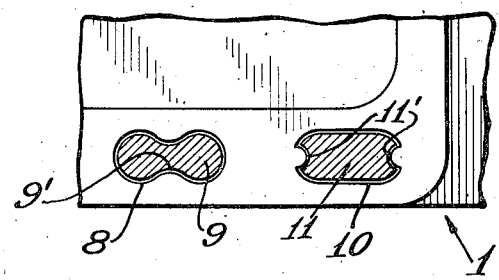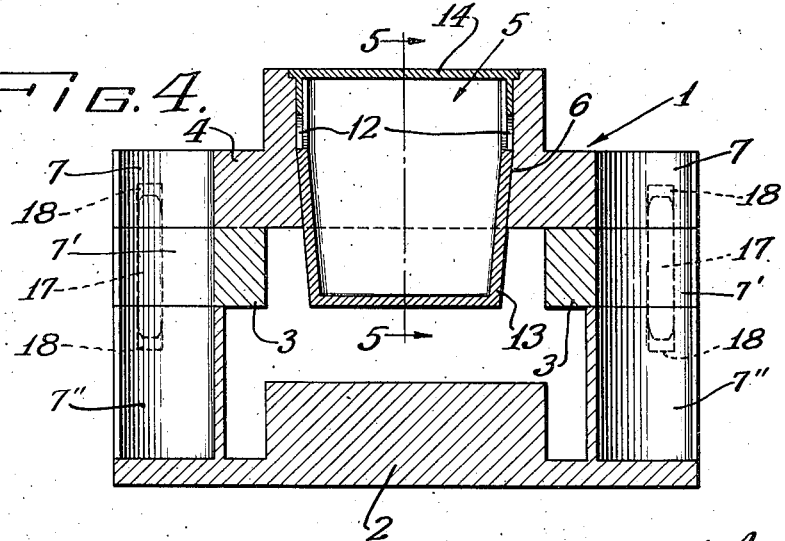

Feb. 11, 1947.  S. J. STANTON  2,415,447
DENTAL CARE OUTFIT
Filed Nov. 18, 1944   5 Sheets-Sheet 3

Inventor:
J. Stanton

Feb. 11, 1947. S. J. STANTON 2,415,447
DENTAL CARE OUTFIT
Filed Nov. 18, 1944 5 Sheets-Sheet 4
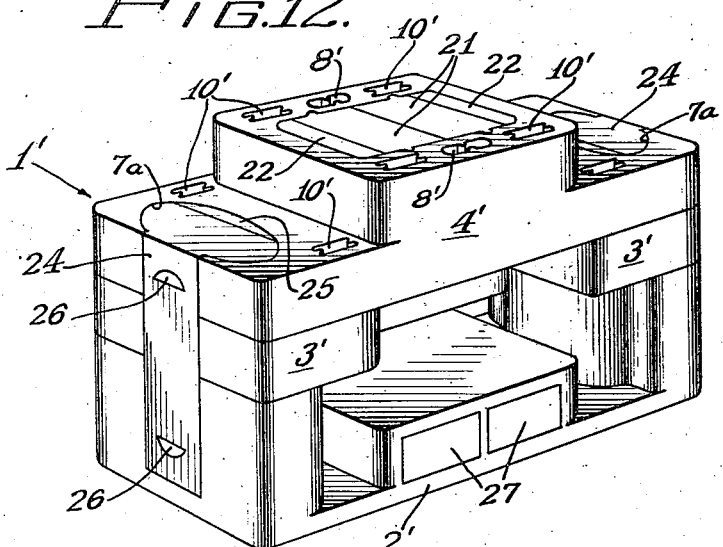
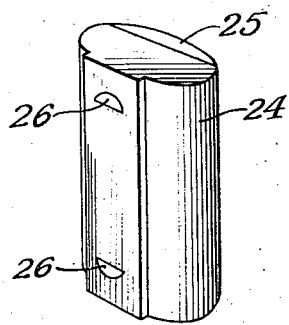
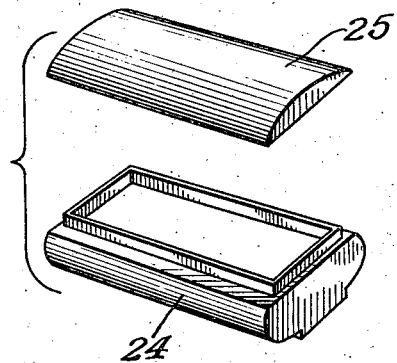
Inventor:
J. S. Stanton

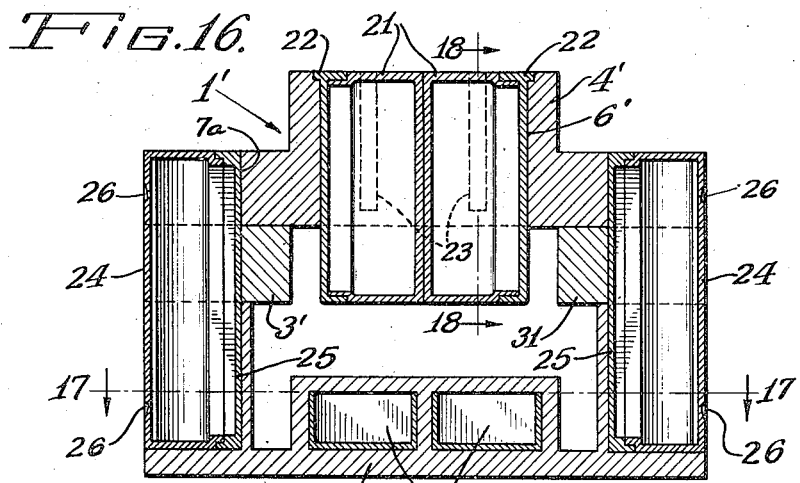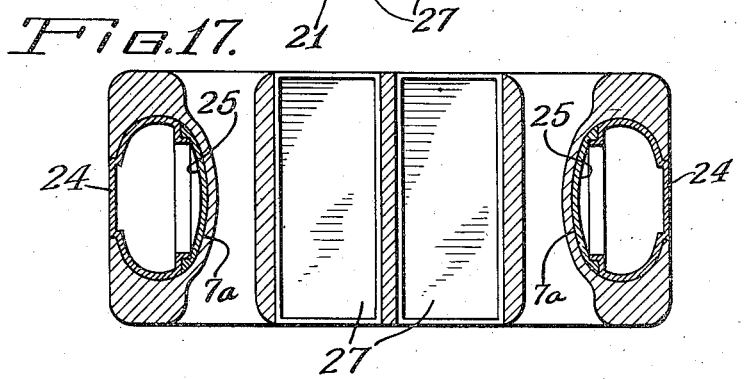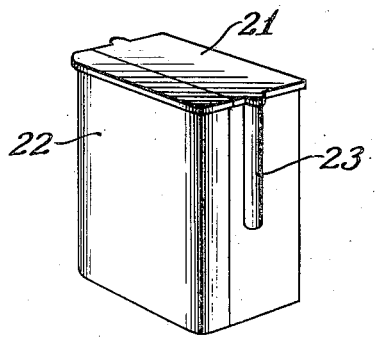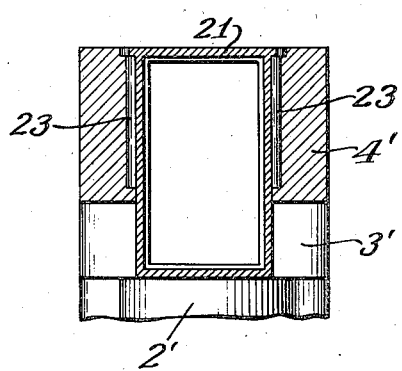

Patented Feb. 11, 1947

2,415,447

UNITED STATES PATENT OFFICE 2,415,447

DENTAL CARE OUTFIT

Samuel John Stanton, Chicago, Ill., assignor to Patents Promotions Corporation, Chicago, Ill., a corporation of Illinois Application November 18, 1944, Serial No. 564,052

7 Claims. (Cl. 132—84)

The present invention, an improvement of my Tooth brush holder Patent No. 2,117,459, dated May 17, 1938, introduces a combination of tooth brush holder with correlated appurtenances—a merger comprising a tooth brush holder, a plurality of tooth brushes and a plurality of dentifrice containers as a prophylactic unit.

One object of this combination is sanitation. The unit makes available conveniently and readily a dentifrice container, as well as a tooth brush, for each person in a family.

Individual use of brushes is an established practice which is accepted as a matter of course. Individual use of dentifrice container is a new expedient. This practice—individual use of dentifrice container—seems to have become desirable because the simple fact has finally been discovered that to dip a brush into powder container is more practical than to shake powder onto a brush through a hole in a can, and this discovery seems to have come with a renewed appreciation of the efficacy of powder. The absence of an individual container, shaped for brush dipping, has undoubtedly been a factor in the slow return to tooth powder, which originally was the universal dentifrice.

Another object of this unit is artistic effect, the embodiment of the various elements, holder, brushes and containers, into an object of beauty. In the unit as herein disclosed all these elements are not only functionally coactive, but also integrated as a piece of craftsmanship, a shapely thing expressing a mood in artistic composition.

Still another object of the present unit is efficiency. Because the brushes and containers are keyed to positions within the container, users are obliged to replace these elements in predetermined order, which means comfort and expedience of every element in its place.

Referring to the drawings in general, which are made a part of this specification:

Fig. 1 is a perspective view of the present prophylactic outfit.

Fig. 2 shows this outfit dis-assembled.

Fig. 3 is a top view of it.

Fig. 4 is a longitudinal cross section of the unit.

Fig. 5 is a cross section, fragmentary, taken on line 5—5 in Fig. 4.

Fig. 6 is an enlarged fragmentary view of a corner of the combination.

Figure 9:
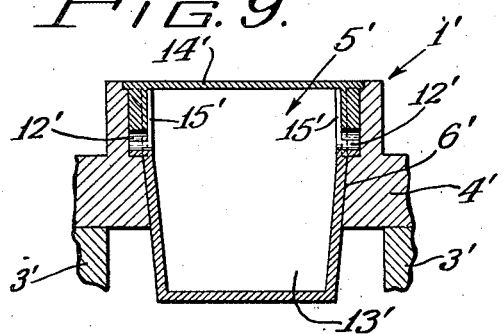
Figure 10:
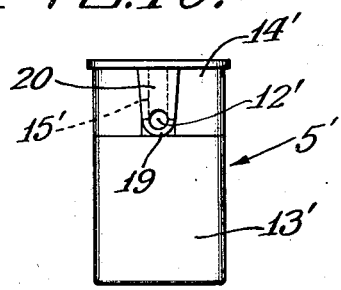

Fig. 9, in a fragmentary view, is a cross section of the element shown in Fig. 10.

Figure 7:
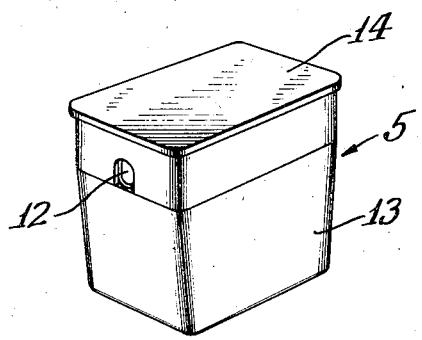
Fig. 7 is a perspective view of one of the elements of the unit—a powder container.

Fig. 10 is a lateral view of a modified form of the element shown in Fig. 7.

Figure 11:
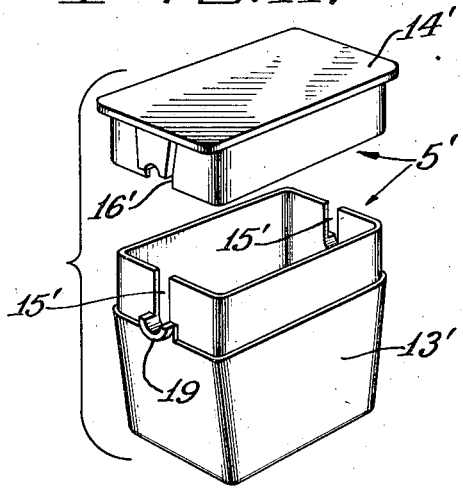

Fig. 11 shows in perspective, in separated parts, the element delineated in Figs. 9 and 10.

Fig. 12 is a perspective view in modified form of the unit shown in Fig. 1.

Figs. 13 to 15 show perspectively container elements incorporated in the unit as shown in Fig. 12.

Fig. 16 is a longitudinal cross section of Fig. 12.

Fig. 17 is a cross section taken on the line 17—17 of Fig. 16.

Fig. 18 is a fragmentary cross section of one end of the unit delineated in Figs. 12, 16 and 17.

Fig. 19 is a perspective view of one of the container elements incorporated in the unit, Figs. 12 and 16.

Referring to the drawings somewhat in detail, in which like numerals refer to like parts, numeral 1 points to the prophylactic unit as a whole. Numeral 2 a base with a step which functions primarily to effect decorative grouping of the tooth brush elements 9 and 11, and, in combination with other members, to afford access to the bottom of container 5. That is, the step is an element which keeps some of the brushes higher than the others in the bouquet-like combination, and makes it possible for the user to insert his finger under the container when he wants to push it out of its receptacle. The space therebetween also serves for ventilation.

Numeral 3 points to the unique sectional construction, better exhibited in Fig. 2. This kind of construction lends itself to designing of the unit in different colors. Part 3, for example, may be of black material while parts 2 and 4 of the unit are in green. This is one of the devices, as is base 2, making the unit a thing of beauty. One affords the injection of color decoration. The other affords a floral or well-balanced effect of brushes in a combination that otherwise are mere appendages on a wall—if at all assembled. The separated parts of the unit skeleton, 2, 3 and 4, may be held together, of course, by adhesives or such a device as pegs 17 fitting into holes 18.

Numeral 5 shows an element in the unit which constitutes a dentifrice container. This container is shown in perspective in Fig. 7.

Numeral 6 shows the opening in the unit which functions cooperatively with the element 5, the dentrifice container. Numerals 8 and 10 point out apertures integrated with such members as 9 and 11 through such means as cooperating tongue and groove elements $9^1$ and $11^1$ in Fig. 6. These means, differentiated in size or shape, or both, allow only restricted associations between the members and their corresponding apertures. The tooth brush that fits in one of the openings will not fit into another of them. These restricted associations induce a habit for each user to put his brush in a definite place—and to find it in a definite place—which results not only in economy of effort but in the maintenance of the outfit as a functional unit.

The interfitting means between the members of the unit herein shown as differentiated tongue and groove elements and cooperating shapes may, of course, be other kinds of combining elements. The object of them all, however, is to effect a functional organism, in which each brush is keyed to its place in the objective performance of the unit to induce the habit of economy of effort on the part of the user.

Numeral 7 indicates a socket in the unit in which a dentifrice container or a tube of toothpaste may be accommodated.

In Figs. 4 and 5, the coaction of container 5 and the skeleton or framework of the unit, is shown by numerals 6, 12 13 and 14. Numeral 12 is an emission orifice, which is subserved by the receptacle wall of the member 4—wall serves as a stopper or closure for the orifice. This again is a part of the conception of the utility as a whole. The unit, as outlined in the drawings contemplates service for a family of five. It accommodates two brushes and one dentifrice container for each member of the family—brushes and containers "keyed" to respective receptacles in the skeleton of the unit.

Wider use of tooth brushes is now fully appreciated. It is therefore becoming a practice for each person daily to use two tooth brushes, a soft one in the morning, a stiffer one in the evening. The individual use of tooth powder container is a practice that now must follow, since tooth powder is a much better and cheaper cleanser than toothpaste. People at present are loath to use powder because, for one thing, shaking it through a can orifice upon a tooth brush is wasteful effort. The box-like container disclosed in the present combination affords the brush dipping method, which is a much easier, quicker and conserving method.

Figs. 12 to 19 show how the individual container members are incorporated and keyed individually for each of the five users in contemplation.

Numerals 24 and 25 show perspectively and disassembled the powder container which is incorporated in the ends of the unit. The unit should show a monogram or crest of the family on the spot, for instance, where numeral 4' appears in Fig. 12. The right end container may serve father, while the left end container may serve mother. So on with the others. Container 21, it should be noted, coacts with a wall in the section 2', which subserves as a cover for the container. Numerals 21 and 22 indicate two containers incorporated within the skeleton part 4'. Figs. 16, 18 and 19 show cooperatively keyed receptacle by means of tongue and groove elements at 23.

Figure 8:
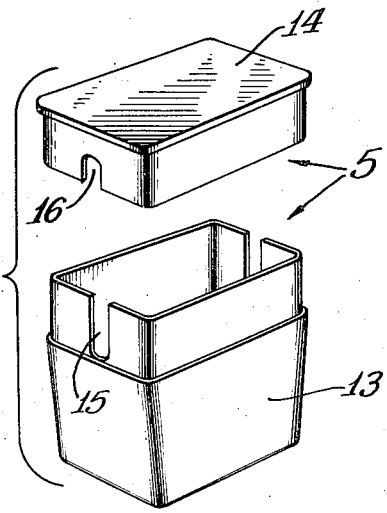
Fig. 8 shows this element in separate parts.

In Figs. 7 and 8, a powder container 5, orifice 12 for powder emission is formed by two slots 15 and 16. In Figs. 9 to 11, a liquid dentifrice container, the emission orifice 12' is shown as a nozzle, made up of elements 15', 16'' and 19. In both containers, Figs. 7 to 11, the emission orifice is subserved coactively by the wall in the skeleton, the subserved wall functioning as a cover for the orifice. Numeral 26 indicates nail holds in container 24, which facilitate the removal of the container from its receptacle 7(a), Fig. 12.

Ordinarily ten tooth brushes and five dentifrice containers for a family bathroom would be unthinkable. But as the dental prophylactic unit, it is accepted as a useful object and a thing of beauty.

The foregoing specification is, of course, merely a suggestive description and is not in limitation of the novelty.

I claim:

1. A tooth brush holder having apertures, vertically therein, embracing tooth brushes and means between the brushes and the holder keyed to each other determining the position of the brushes severally within the holder.

2. A combination of a tooth brush holder and a plurality of tooth brushes, constituting an economic, sanitary, labor-saving kit in an attractive and handy form, said holder having apertures accommodating said brushes vertically therein keyed severally to positions within said combination.

3. A prophylactic outfit having a skeleton member comprising a plurality of sections, at least one dentifrice container having a dispenser orifice, a plurality of tooth brushes and means releasably holding said sections together as said skeleton, at least some of said sections combinedly incorporating vertically aligned apertures accommodating tooth brushes, at least some of said sections combinedly incorporating vertically aligned recesses accommodating tooth paste tubes, one of said sections having an opening embracing therein suspendingly said dentifrice container, dispenser orifice of the container subserved by a part of the skeleton, within the said opening, as an orifice closure.

4. A dental care outfit having a skeleton member comprising a plurality of sections, at least one dentifrice container and a plurality of tooth brushes, means holding said sections releasably combined as said outfit, said sections in combination including apertures therethrough and, within the skeleton, recesses terminally, tooth brushes keyed to apertures, top section having an opening embracing said dentifrice container having a discharge orifice subserved by a wall within said opening, recesses adapted to receive dentifrice containers.

5. A prophylactic outfit having a skeleton member comprising a plurality of coactively associated elements disposed in three horizontal layers, contiguously forming therebetween a space within said skeleton member, the top horizontal element being co-extensive with the length of the skeleton member, having an opening over and in extension of the said included space, a dentifrice container, having a discharge outlet in at least one of its vertical walls, suspended within said top element opening, a vertical contacting wall therein subserving said outlet as a closure, the bottom horizontal element being co-extensive with the skeleton, a plurality of apertures extending vertically through the elements in the upper two layers of elements, the tooth brush handles resting on the element constituting the bottom layer, and interfitting means between the skeleton and the brushes holding the brushes keyed respectively within the said apertures.

6. A combination dental care outfit having a skeleton member comprising a plurality of elements, means releasably combining said elements as said skeleton, at least one dentifrice container having at least one discharge outlet, and a plurality of tooth brushes severally fitted to said skeleton forming a component part of said outfit, the skeleton elements disposed in groups enclosing a ventilation air space therebetween, aligned apertures therethrough and aligned recesses therein, the composition of the skeleton comprising elements affording color combinations for the outfit, and the air space being around the tooth brushes affording sanitation therefor, one of the elements having an opening embracing said container, a contacting wall therein subserving as a closure for the discharge outlet thereof, and said aligned apertures embracing said tooth brushes, cooperating elements therebetween fixing severally said tooth brushes to fixed positions within and as a part of the outfit.

7. A block-shaped rack composing a dental care outfit comprising a skeleton made up of a base element, a top element and two medial elements, the top element co-extensive with the base element, the two medial elements spaced apart in a layer between the top and bottom elements, the top element having an opening extending into the space between the two medial elements and in continuation of a space between the bottom element and the medial elements, means releasably holding said elements combined as said skeleton, a dentifrice container embraced within the top element opening, having at least one discharge outlet, a wall within said top element opening subserving as a closure for said discharge outlet, apertures extending through the top element and also apertures in alignment through the medial and top elements embracing therein tooth brushes, the ends of said brushes resting on the bottom element, and interfitting means within the apertures between the tooth brushes and the skeleton elements holding the brushes respectively keyed to fixed positions within the skeleton.

SAMUEL JOHN STANTON.

REFERENCES CITED

The following references are of record in the file of this patent:

UNITED STATES PATENTS

| Number | Name | Date |
|---|---|---|
| 104,175 | Alister | June 14, 1870 |
| 1,804,279 | Schnell et al. | May 5, 1931 |
| 1,598,365 | Clarke | Aug. 31, 1926 |
| 2,117,459 | Stanton | May 17, 1938 |